Oct. 21, 1958  M. O. SEM ET AL  2,857,444
GAS COLLECTING APPARATUS FOR OPEN FURNACES
Filed Dec. 23, 1955  3 Sheets-Sheet 2

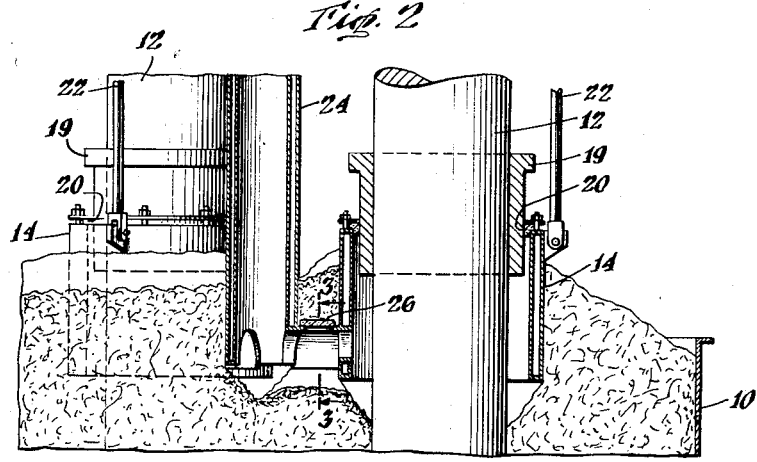
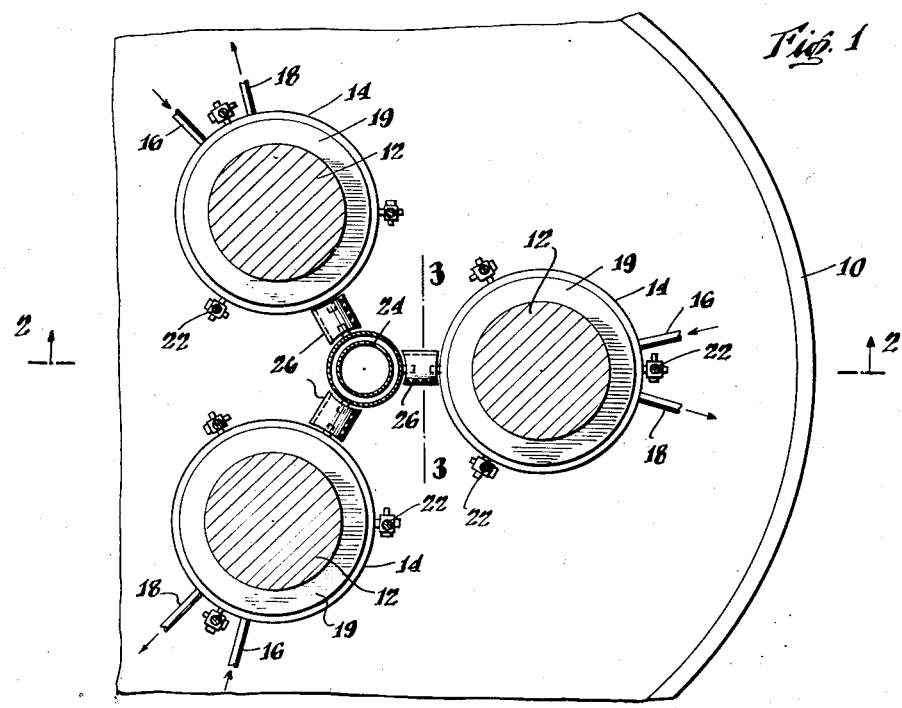
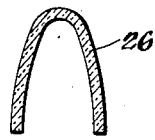

INVENTORS
Mathias O. Sem
Orvar Braaten
BY
ATTORNEYS

Oct. 21, 1958  M. O. SEM ET AL  2,857,444
GAS COLLECTING APPARATUS FOR OPEN FURNACES
Filed Dec. 23, 1955  3 Sheets-Sheet 3
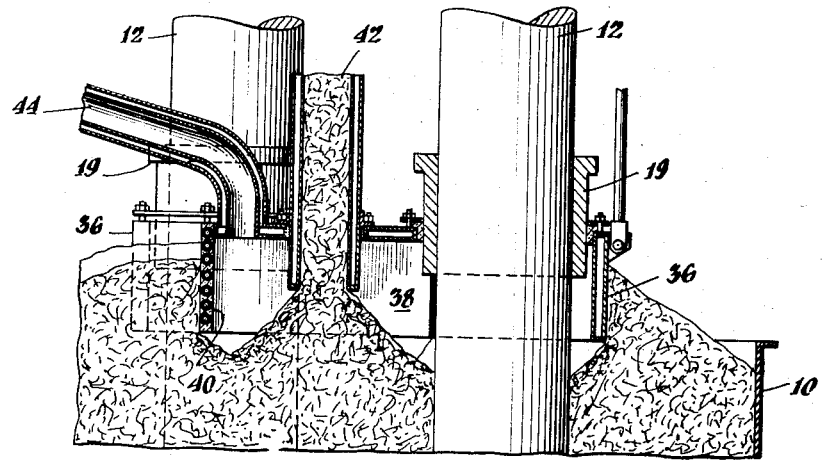
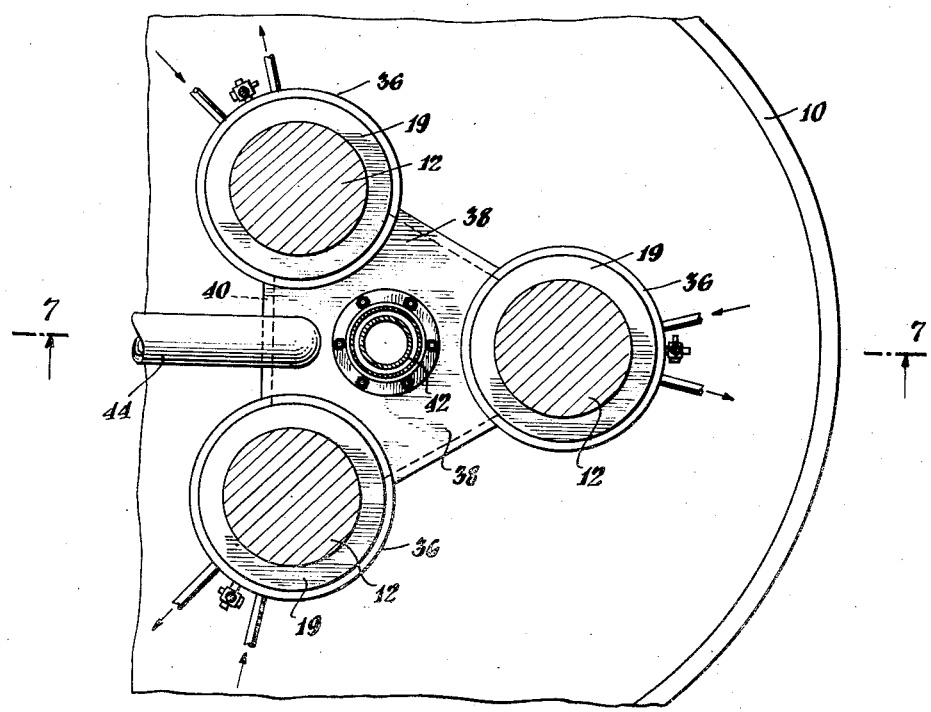
INVENTORS
Mathias O. Sem
Orvar Braaten
BY
Eyre, Mann & Burrows
ATTORNEYS United States Patent Office 2,857,444
Patented Oct. 21, 1958

2,857,444

GAS COLLECTING APPARATUS FOR OPEN FURNACES

Mathias Ovrom Sem, Smestad, Oslo, and Orvar Braaten, Slemdal, Oslo, Norway, assignors to Elektrokemisk A/S, Oslo, Norway, a corporation of Norway Application December 23, 1955, Serial No. 555,152

Claims priority, application Norway December 24, 1954

5 Claims. (Cl. 13—9)

Electrical smelting furnaces of the type in which the charge is filled in to a substantial depth around the electrodes may be divided into two types, one of which is closed by a roof and the other of which is open. With the closed furnace it is a relatively simple matter to collect the gases and furnace dust evolved during the smelting but the fact that the furnace is closed offers some difficulties in connection with the stoking operation.

An open furnace is easy to stoke but ordinarily the gases from such a furnace simply escape into the furnace room, carrying with them appreciable amounts of dust from the furnace operation. The present invention relates to a structure whereby the major portion of the gases can be collected in an open furnace and at the same time the dust carried by the gases will largely be caught and much of it will be returned to the furnace charge.

Elimination of dust from the "off" gas lines is a matter of considerable importance, for if it is not taken care of the lines will rapidly clog, necessitating a shutdown of the furnace.

This application relates particularly to furnaces of the type using three-phase currents with three electrodes arranged in a triangle. It has been found that with closed furnaces of this type, an increased efficiency is had by returning the "fines," that is, the dust and particles less than 4 mm. in diameter to the central zone between the electrodes. (See Sem Patent No. 2,769,705 issued November 6, 1956.) It is a feature of the present application that in an open furnace the dust which is collected is also largely returned to this central zone.

Broadly speaking, our invention comprises supplying generally cylindrical members suspended near the top of the furnace with each such cylinder appreciably larger than the electrode so as to form a gas-collecting area between the inside of the cylinder and the outside of the electrode and with an electrode passing through such cylinder. Packing is supplied so that a substantially gastight joint is obtained between the top of the cylinder wall and the electrode (or electrode holder) while movement of the electrode up and down through the cylinder is permitted.

The charge will ordinarily be introduced into the furnace principally around the outer edges and the gas will rise adjacent the outer surface of each electrode carrying with it appreciable quantities of dust. This gas will enter the cylinder around the electrode and in accordance with our invention the gas is then conducted to a blending zone between the electrodes and is caused either by rapid expansion or by the creation of turbulence and loss of velocity to give up a substantial amount of its charge of dust which in turn is deposited in the central area between the electrodes. As the charge moves into the actual reaction zone the dust will be carried with it and will be reacted while causing a minimum of difficulty due to clogging.

Various modifications in details may be employed for handling the gas so that it will release the dust which it carries and deposit it in the central area. For example, the gas from the cylinders may be conducted to a central pipe which is open at the bottom. This may be accomplished by using channel members which are also open at the bottom through which the gas may move relatively slowly, depositing some of the dust as it goes and finally entering the central pipe which forms a blending zone where the introduction of gases from different directions will cause turbulence and loss of velocity that will result in additional dust being dropped out; or the gases may be introduced into the central pipe in an upward direction at higher velocities so that most of the dust will be carried to the central pipe and then by having the central pipe of larger diameter than the pipes leading into it, the expansion and reduction in velocity in the zone where the gases blend will cause the gases to give up their dust. As an alternative, instead of a central pipe we may form a somewhat larger blending zone in the form of a central chamber into which the gases may come directly from the cylinders so that the turbulence in this chamber will cause the dust to drop out onto the charge, with the gas being withdrawn from the top of this chamber area. In such case the actual gas withdrawal does not have to be centered directly between the electrodes. If desired, an additional charge (which may be fine material) may be introduced into the central zone between the electrodes. This will assist in causing the collected dust to be brought into a reaction zone where it will again be treated as part of the charge.

This invention may be readily understood by reference to the accompanying drawings in which Fig. 1 is a plan view of a portion of a furnace showing a triangular arrangement of electrodes and gas-collecting apparatus;

Fig. 2 is a section on line 2—2 of Fig. 1;

Fig. 3 is a detailed sectional view on line 3—3 of Fig. 1;

Fig. 6 is a view corresponding to Figs. 1 and 4 showing still another arrangement, and Fig. 7 is a section on line 7—7 of Fig. 6.

Figure 5:
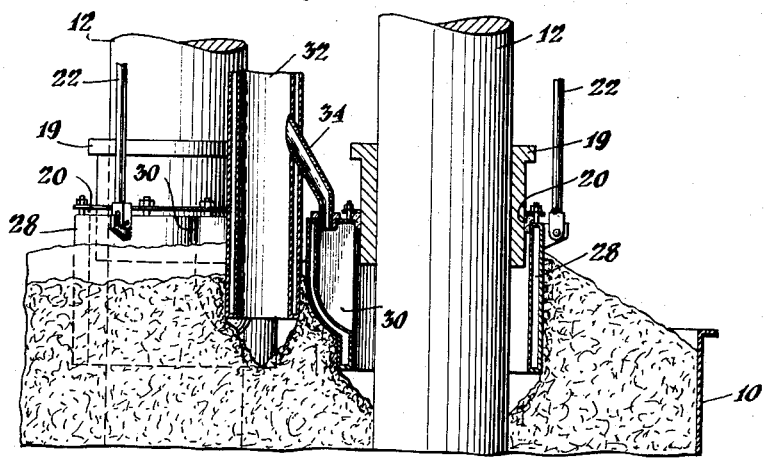
Fig. 5 is a section on line 5—5 of Fig. 4.
Figure 4:
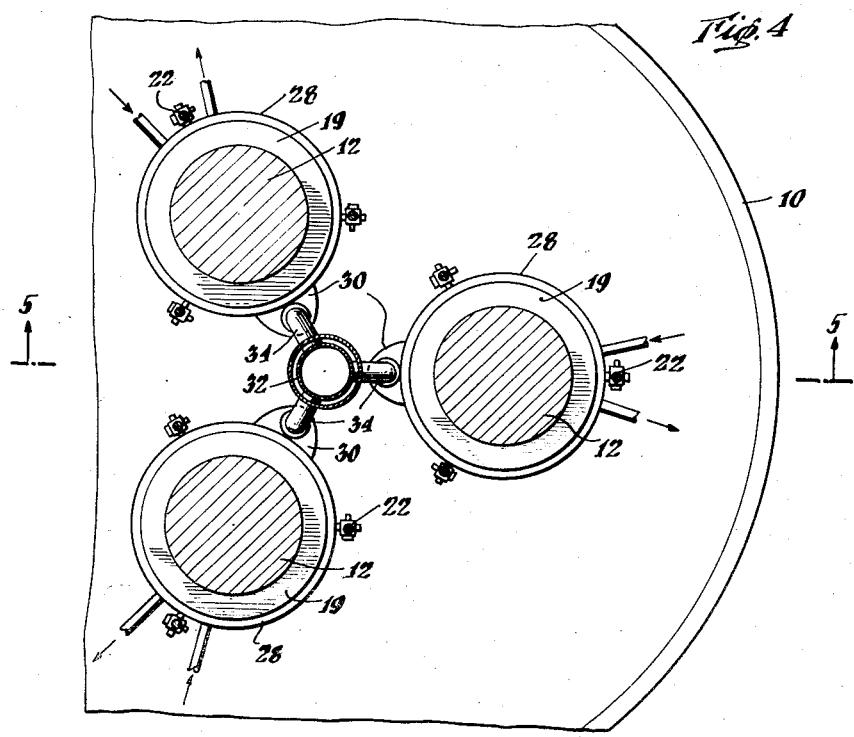
Fig. 4 is a view corresponding to Fig. 1 showing a different method of withdrawing the gases from the collecting rings or cylinders.

In all the figures it is understood that there will be a fixed overhead structure (as the ceiling of the furnace room) from which parts may be suspended. This is not shown in the drawings.

Referring to Figs. 1 to 3, the numeral 10 indicates the furnace pot and the numeral 12 indicates the electrodes which extend down into the furnace pot. Each of the electrodes 12 is surrounded by a cylinder 14 which ordinarily should be water-cooled as by the pipes 16 and 18. Packing 20 makes a substantially gas-tight joint between the electrode holders indicated at 19 and the cylinders 14. The cylinders 14 are suspended from the superstructure, not shown, by suspension members 22.

A central pipe 24 is provided for the withdrawal of gas. This pipe runs down into the charge, with its bottom approximately on a level with the lower line of the cylinders 14 and it is to be noted that the bottom of the pipe 24 is open. U-shaped ceramic members 26 serving as inverted channels connect the cylinders 14 with the pipe 24 and, as shown in Fig. 2, the bottom portion of each cylinder 14 and the bottom portion of the pipe 24 have openings or notches formed in them corresponding to the cross-section of the members 26. Members 26 are of course used with their open face down.

With the construction shown in these figures the gas formed will largely rise adjacent the outer surfaces of the electrodes 12 and will enter the space between the cylinders 14 and the electrodes. From this space the gas will move toward the center of the furnace through the members 26, giving up part of its dust during such movement. Additional quantities of the dust will be dropped out of the gas due to the turbulence and loss of velocity created in the central pipe 24 and this will drop through the bottom of the pipe back onto the charge at the midpoint between the electrodes.

In Figs. 5 and 6 the electrodes 12 are each surrounded by a cylinder 28 which corresponds to the cylinders 14 but in this case each cylinder 28 has a bulge on the side toward the center of the furnace designated as 30. As before, packing is supplied between the cylinder and the electrode holder. The cylinders 28 are water-cooled and suspended in the same way as the cylinders 14.

As before, a central pipe 32 is supplied for withdrawal of gases and in this case also this pipe is open at the bottom. Instead of the connection between the central pipe and the cylinders being formed by members at the bottom of the cylinders, in this case pipes 34 run up out of the bulges 30 and enter the sides of the pipe 32 above the charge. The pipes 34 can advantageously be made of ceramic material so that no possible short-circuiting will be had between the three electrodes.

As clearly shown in the drawings, the pipes 34 have an aggregate cross-sectional area substantially less than the cross-sectional area of the pipe 32 and slope upwardly toward the pipe 32. This will mean that the gases can continue their upward rise through these pipes maintaining an appreciable velocity until the gas enters the pipe 32. Here because of the large increase in cross-sectional area, the gases can expand and this, taken with the natural turbulence created by the crossing currents, will cause dust to be dropped out and returned to the charge from the bottom of the pipe 32. It may also be noted that if any dust should be dropped out in the pipes 34, these pipes are at a sufficient angle so that they will not become clogged.

In Figs. 6 and 7 the cylinders 36 associated with the electrodes, each have a segment cut out toward the center of the furnace and these cylinders are interconnected by a structure comprising a platform member 38 and side walls 40. This whole structure may be water-cooled or, if desired, the side walls 40 may be formed in whole or in part of ceramic material. In any event care must be taken to see that there is no short-circuiting between the respective electrodes, and this may be taken care of in conjunction with the packing between the electrode holders 19 and cylinders 36 or in any other desired manner. With this structure a central charging shaft 42 is supplied and a pipe 44 withdraws gases from beneath the cover member 38.

Here, as before, the turbulence of the gas entering the area beneath the cover 38 coupled with the fact that it will lose velocity in this area, will cause the dust to be returned to the charge in the central zone between the electrodes.

It is understood that these examples are given only by way of illustration.

What we claim is:

1. In conjunction with an open electric furnace of the type having three electrodes in triangular arrangement and in which it is intended that the charge will extend up for a substantial depth around the electrodes, an apparatus for collecting gas from the furnace and returning dust to the area of the furnace within the triangle formed by the electrodes, comprising a cylindrical member about each electrode of a diameter appreciably larger than the electrode so as to form a gas-collecting area, means for making a substantially gas-tight connection between each such cylinder and its electrode which will close the top of the cylinder while permitting movement of the electrode through the cylinder, means for suspending such cylinders independent of the electrodes so that the electrodes may move relative to the cylinders, an opening from each such cylinder aimed solely in the direction of the central area between the electrodes, means opening downwardly towards a portion of the charge below such central area but closed towards the sides of the furnace forming a blending zone for blending gases from said openings in which the velocity of the gases from said openings is interrupted in order that dust may be dropped from the gases onto the charge, and means for withdrawing gas from such blending zone.

2. A structure as specified in claim 1 in which the means which forms the blending zone consists of the lower portion of a pipe positioned vertically between the electrodes, which pipe is open at its bottom, and in which the upper portion of the same pipe forms a portion of the means for withdrawing the gases, said structure also including connecting members for conducting the gases from the cylinders to said pipe.

3. A structure as specified in claim 2 in which said connecting members are channels open at their bottoms and positioned near the bottom of the cylinders and of said central pipe.

4. A structure as specified in claim 2 in which said connecting members run up from the cylinders to enter said central pipe above the charge and have an aggregate cross-sectional area less than the cross-sectional area of said pipe.

5. A structure as specified in claim 1 in which the three cylinders are connected by side walls and a platform member to form a central zone in which the gases blend, and a pipe runs up from said platform to withdraw gases from within said central zone.

References Cited in the file of this patent

UNITED STATES PATENTS 2,769,705    Sem                Nov. 6, 1956

FOREIGN PATENTS 292,229      Switzerland          Dec. 15, 1947